(12) United States Patent
Hormiere et al.

(10) Patent No.: US 9,783,305 B2
(45) Date of Patent: Oct. 10, 2017

(54) PASSIVE DEVICE FOR GENERATING A FILM OF COLD AIR IN CONTACT WITH AN OUTER SURFACE OF AN AIRCRAFT

(71) Applicant: Airbus Operations SAS, Toulouse (FR)

(72) Inventors: Arnaud Hormiere, Toulouse (FR); Guillaume Clairet, Toulouse (FR)

(73) Assignee: Airbus Operations SAS (FR)

( * ) Notice: Subject to any disclaimer, the term of this patent is extended or adjusted under 35 U.S.C. 154(b) by 664 days.

(21) Appl. No.: 14/084,695

(22) Filed: Nov. 20, 2013

(65) Prior Publication Data

US 2014/0141705 A1    May 22, 2014

(30) Foreign Application Priority Data

Nov. 21, 2012   (FR) ...................................... 12 61077

(51) Int. Cl.
*B64D 13/00* (2006.01)
*B64D 33/02* (2006.01)

(52) U.S. Cl.
CPC ...... *B64D 13/006* (2013.01); *B64D 2033/024* (2013.01)

(58) Field of Classification Search
CPC ...... B64D 13/006; B64D 33/08; B64D 15/00; B64D 2033/024
USPC .................................................... 454/76, 71
See application file for complete search history.

(56) References Cited

U.S. PATENT DOCUMENTS

| 3,005,607 | A | * | 10/1961 | Ferri | ................... | B64D 13/006 |
| | | | | | | 244/117 A |
| 3,364,991 | A | | 1/1968 | Wang | | |
| 3,724,784 | A | * | 4/1973 | Von Ohain | ............ | B64C 23/005 |
| | | | | | | 244/207 |
| 4,392,621 | A | | 7/1983 | Viets | | |
| 6,109,566 | A | * | 8/2000 | Miller | ................... | B64C 23/005 |
| | | | | | | 244/130 |
| 7,922,126 | B2 | * | 4/2011 | Meister | ................. | B64C 21/025 |
| | | | | | | 244/123.12 |
| 2004/0245389 | A1 | * | 12/2004 | Behrens | ................... | B64D 1/38 |
| | | | | | | 244/117 A |
| 2009/0173834 | A1 | * | 7/2009 | Prince | .................... | B64C 23/06 |
| | | | | | | 244/198 |
| 2010/0205975 | A1 | | 8/2010 | Cloft et al. | | |
| 2010/0303634 | A1 | | 12/2010 | Long | | |

FOREIGN PATENT DOCUMENTS

FR           754 933 A      11/1933

* cited by examiner

*Primary Examiner* — Gregory Huson
*Assistant Examiner* — Dana Tighe
(74) *Attorney, Agent, or Firm* — Lerner, David, Littenberg, Krumholz & Mentlik, LLP

(57) ABSTRACT

An aircraft includes a first outer surface exposed to a hot air flow flowing in a flow direction and a device for generating a film of cold air in contact with a region to be protected of the first outer surface. The device includes a cold air outlet arranged upstream of the region to be protected as seen in the flow direction, and an inlet arranged at a second outer surface of the aircraft in contact with cold air. The inlet is arranged such that a pressure gradient exists between the inlet and the outlet so as to generate a natural flow of cold air from the inlet to the outlet as well as means to cause said inlet to communicate with said outlet.

10 Claims, 1 Drawing Sheet

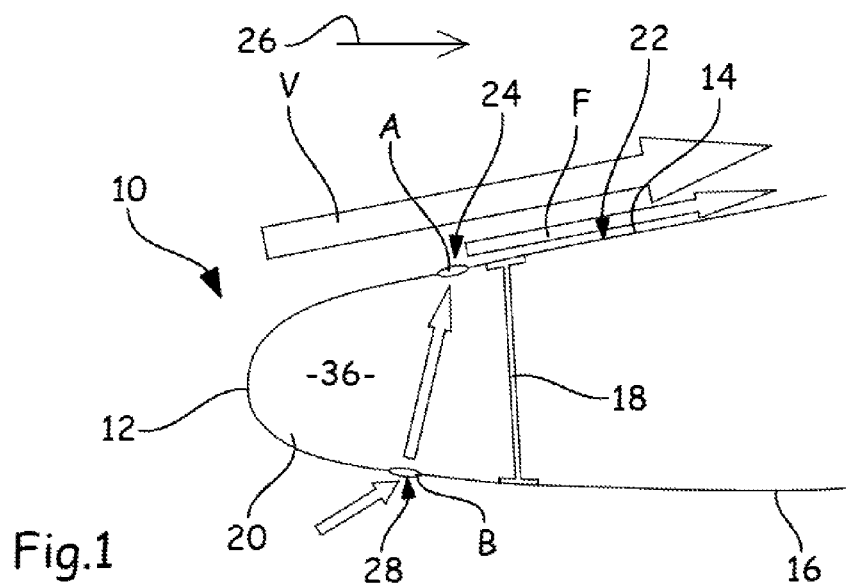
Fig.1
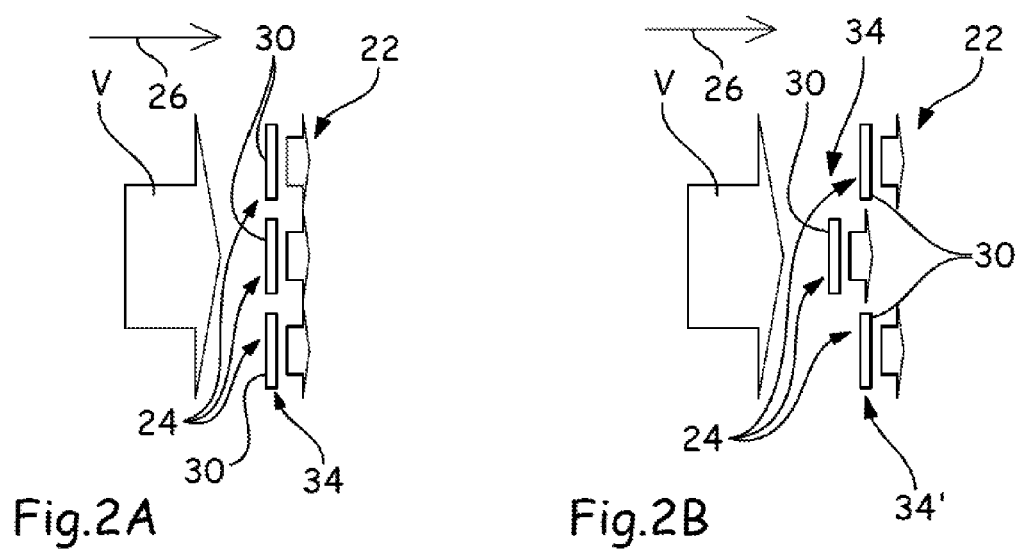
Fig.2A  Fig.2B
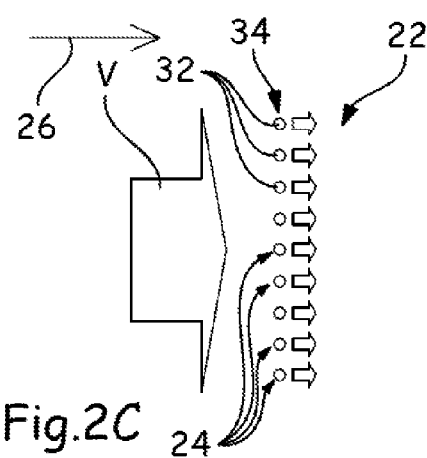 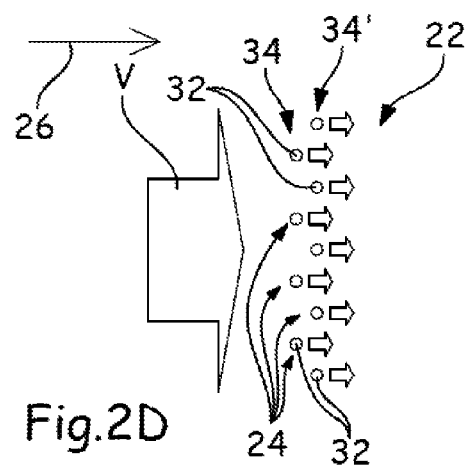
Fig.2C  Fig.2D

PASSIVE DEVICE FOR GENERATING A FILM OF COLD AIR IN CONTACT WITH AN OUTER SURFACE OF AN AIRCRAFT

FIELD OF INVENTION

The present invention relates to a passive device for generating a film of cold air in contact with an outer surface of an aircraft.

BACKGROUND OF THE INVENTION

An aircraft is generally equipped with air systems, in particular for cooling certain parts, comprising circuits which extend from at least one air inlet to at least one air outlet, passing through heat exchangers.

Technological progress means that cooling requirements are increasing. Thus, as engine temperatures rise, the amount of heat which must be removed follows an upward trend, leading to an increase in the flow rate of air used for cooling and/or in the temperature of the air discharged outside the aircraft.

Although specific grilles, such as those shown in the document FR-2,911,116, have been developed so as to limit the perturbations caused by these air systems, the increase in flow rate of air used for cooling has a generally negative influence on the aerodynamics of the aircraft. As a consequence, the increase in cooling requirements cannot be made up for simply by increasing the flow rate, such that the temperature of the discharged air stream tends to increase.

However, when this temperature exceeds a certain threshold, the problem arises that the exiting air stream comes into contact with certain portions of the outer surface of the aircraft, made of composite material.

So as to limit the temperature of the air stream in contact with the outer surface, a first solution consists in equipping the surface to be protected with devices which can be used to generate aerodynamic perturbations, as shown in the document FR-2,920,130, in order to mix the hot air of the stream with the surrounding cold air. Although this solution makes it possible to limit the risk of damage to the outer surface made of composite material, it affects the aerodynamics of the aeroplane.

A second solution consists in generating a film of cold air at the outer surface so as to insulate it from the hot air stream. In this case, the cold air is produced by a cold air source installed in the aircraft and discharged outside the aircraft via a cold air outlet which is close to the hot air outlet and offset with respect to the latter in the direction of the flow of air outside the aircraft. According to one embodiment, at the outer surface, a plate separates the hot air outlet from the cold air outlet.

This solution is not entirely satisfactory as it involves an additional energy requirement in order to produce the cold air and convey it towards the outlet. In addition, this solution is effective only over a restricted region to the rear of the hot air outlet. Finally, the plate used to separate the hot air and the cold air produces parasitic drag which affects the aerodynamics of the aircraft.

BRIEF SUMMARY OF THE INVENTION

An aspect of the present invention proposes an air film generating device of the passive type, that is to say one which does not require energy in order to produce cold air or to convey it.

The invention relates to an aircraft comprising a first outer surface exposed to a hot air flow flowing in a flow direction and a device for generating a film of cold air in contact with a region to be protected of said first outer surface, characterized in that the device comprises a cold air outlet arranged upstream of the region to be protected as seen in the flow direction, an inlet arranged at a second outer surface of the aircraft in contact with cold air, said inlet being arranged such that a pressure gradient exists between said inlet and said outlet so as to generate a natural flow of cold air from said inlet to the outlet as well as means to cause said inlet to communicate with said outlet.

BRIEF DESCRIPTION OF THE DRAWINGS

Other features and advantages will emerge from the following purely illustrative description of the invention, with reference to the appended drawings, in which:

FIG. 1 is a section through the wing of an aircraft equipped with a device according to an embodiment of the invention, FIGS. 2A to 2D are views from above of various variants according to embodiments of the invention.

DETAILED DESCRIPTION

In FIG. 1, the reference 10 designates the forward portion of an aircraft wing having a leading edge 12 which extends, in the upper portion, in form of an upper outer surface 14 also termed the suction face and, in the lower portion, in the form of a lower outer surface 16 also termed the pressure face. A reinforcing element such as a forward frame 18 can connect the upper outer surface 14 and the lower outer surface 16 in a manner which is offset with respect to the leading edge 12. In this case, the leading edge 12 and the forward frame 18 define a duct 20 in the shape of a back-to-front D.

An outer surface is understood as a surface of an aircraft which is in contact with a flow of air.

According to one embodiment, the leading edge 12 which extends as far as the forward frame 18 is made of metal. The upper outer surface 14 and the lower outer surface 16 which extend from the forward frame 18 towards the rear of the wing 10 are made of composite material.

As shown in FIG. 1, a hot air stream V can flow outside the aircraft and come into contact with a region to be protected 22 of the upper outer surface 14.

In flight, a pressure gradient may exist between two separate points of a same outer surface or of two different outer surfaces of an aircraft. That is in particular the case between a point B of the lower outer surface 16 of an airplane wing 10 and a point A of the upper outer surface 14 of the same wing, the pressure being greater at B than at A.

According to an embodiment of the invention, the device for generating a film of cold air comprises at least one cold air outlet 24 arranged upstream of the region to be protected, as seen in the flow direction (labeled 26 in FIGS. 2A to 2D) of the air flows outside the aircraft during flight, and at least one inlet 28 arranged at an outer surface of the aircraft in contact with cold air, said inlet 28 being arranged such that a pressure gradient exists between the inlet 28 and the outlet 24 so as to generate a natural flow of cold air from the inlet to the outlet by virtue of the pressure gradient.

Thus, according to an embodiment of the invention, the device requires no energy for producing cold air or for conveying it towards the region to be protected.

Depending on the variant, the device comprises several outlets 24 in the form of slots 30 oriented perpendicular to the flow direction 26 as shown in FIGS. 2A and 2B or several outlets 24 in the form of circular holes 32 as shown in FIGS. 2C and 2D.

The invention is not limited to these cross section shapes for the outlet(s) 24.

Depending on the variant, the device comprises several outlets 24 aligned in a row 34 which intersects (and is preferably perpendicular to) the flow direction 26, as shown in FIGS. 2A and 2C, or aligned in several rows 34, 34' which intersect (and are preferably perpendicular to) the flow direction 26, as shown in FIGS. 2B and 2D. When the outlets 24 are aligned in several rows, they are preferably arranged with an offset from one row to the next.

The spacing between two adjacent outlets 24 is determined so as to obtain a continuous film of cold air F and not several discontinuous cold air streams, one for each outlet, oriented in the flow direction 26.

The number of outlets 24 is adjusted depending on the width of the region to be protected, wherein this region must be covered by the film of cold air F.

Advantageously, the outlets 24 are inclined such that the air flow leaving the outlet is not normal to the outer surface but inclined in the flow direction 26. Thus, the air flow leaving each outlet makes an angle of less than 60° with the outer surface in a plane containing the flow direction 26.

As is the case with the outlets 24, the device comprises several inlets 28 in the form of slots, circular holes or other shapes, aligned in one or more rows which intersect (and are preferably perpendicular to) the flow direction 26.

According to an embodiment of the invention, the cold air outlet(s) are not necessarily adjacent to the hot air outlets. They can be arranged upstream of the region to be protected and be sufficient in number to generate a continuous film of cold air F covering the entire region to be protected 22.

The inlets 28 and/or the outlets 24 are preferably of the flush type so as to minimize the impact on the aerodynamics of the aircraft.

According to an embodiment of the invention, the device comprises means to cause the inlet(s) 28 to communicate with the outlet(s) 24.

According to one embodiment, the device comprises ducts, each being connected on one hand to one or more inlets 28 and on the other hand to one or more outlets 24.

According to one preferred embodiment, shown in FIG. 1, the inlets 28 and the outlets 24 communicate with at least one cavity 36 of the aircraft which is not designed exclusively for conveying the air from the inlet 28 towards the outlet 24. This cavity 36 is preferably airtight.

In the case of a wing 10, this cavity 36 corresponds to the duct 20 delimited by the leading edge 12 and the forward frame 18.

In the case of a nacelle, the latter comprises a leading edge in the form of a lip which extends inside the nacelle in the form of an inner duct which channels the air towards the means of propulsion and outside the nacelle in the form of an external surface. The nacelle comprises a forward frame which delimits, with the lip, an annular duct termed «D-duct». In the case of a nacelle, the device comprises outlets on the inner duct and inlets arranged on the external surface, wherein the inlets and the outlets communicate with the «D-duct».

The device according to an embodiment of the invention can be installed close to a leading edge of an aircraft, said leading edge delimiting, with a reinforcing element, a cavity with which the inlet(s) and the outlet(s) of the device communicate, said leading edge extending in the form of an upper outer surface and a lower outer surface, the outlet(s) 24 opening onto the upper outer surface and the inlet(s) 28 opening onto the lower outer surface.

Thus, according to this arrangement, it is not necessary to provide specific channels for conveying the cold air between the inlet(s) and the outlet(s). An existing cavity, delimited in part by the wall comprising the inlet(s) 28 and by the wall comprising the outlet(s) 24, is used.

The invention claimed is:

1. An aircraft comprising:
    a leading edge of an aircraft wing, the leading edge having an upper outer surface exposed to a hot air flow flowing in a flow direction and a lower outer surface in contact with cold air;
    a reinforcing element connecting the upper outer surface and the lower outer surface such that the upper outer surface, the lower outer surface, the leading edge, and the reinforcing element define a cavity therebetween,
    a cold air outlet arranged in the upper outer surface upstream of the reinforcing element in the flow direction; and
    an inlet arranged at the lower surface, said inlet being arranged such that a pressure gradient exists between said inlet and said outlet so as to generate a natural flow of the cold air from said inlet to the outlet through the cavity.

2. The aircraft according to claim 1, further comprising a plurality of outlets arranged in at least one row intersecting the flow direction.

3. The aircraft according to claim 2, wherein the outlets are arranged in a plurality of rows, with an offset from one row to the next.

4. The aircraft according to claim 2, wherein the outlets take the form of slots oriented perpendicular to the flow direction.

5. The aircraft according to claim 1, further comprising a plurality of inlets arranged in at least one row intersecting the flow direction.

6. The aircraft according to claim 5, wherein the inlets are arranged in a plurality of rows, with an offset from one row to the next.

7. The aircraft according to claim 5, wherein the inlets take the form of slots oriented perpendicular to the flow direction.

8. The aircraft according to claim 1, wherein at least one of the inlet and the outlet is flush.

9. The aircraft according to claim 1, wherein the upper outer surface and the lower outer surface downstream of the reinforcing element in the direction of the flow are made of composite material.

10. The aircraft according to claim 9, wherein the leading edge upstream of the reinforcing element in the direction of the flow is made of a metal.

* * * * *